(12) United States Patent
Hampson et al.

(10) Patent No.: US 11,674,494 B2
(45) Date of Patent: Jun. 13, 2023

(54) PRE-CHAMBER SPARK PLUG WITH TUBULAR ELECTRODE AND METHOD OF MANUFACTURING SAME

(71) Applicant: Woodward, Inc., Fort Collins, CO (US)

(72) Inventors: Gregory James Hampson, Boulder, CO (US); Domenico Chiera, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 111 days.

(21) Appl. No.: 14/833,291

(22) Filed: Aug. 24, 2015

(65) Prior Publication Data

US 2015/0361945 A1  Dec. 17, 2015

Related U.S. Application Data

(62) Division of application No. 13/042,599, filed on Mar. 8, 2011, now Pat. No. 9,172,217.

(Continued)

(51) Int. Cl.
*F02P 15/10* (2006.01)
*H01T 13/54* (2006.01)

(52) U.S. Cl.
CPC .............. *F02P 15/10* (2013.01); *H01T 13/54* (2013.01); *Y10T 29/49002* (2015.01)

(58) Field of Classification Search
CPC ......... H01T 13/32; H01T 13/06; H01T 13/54; F02P 15/10; F02P 13/00; Y10T 29/49002

(Continued)

(56) References Cited

U.S. PATENT DOCUMENTS

| 892,296 A | 6/1908 | Oberhansli |
| 1,009,867 A | 11/1911 | Terry |

(Continued)

FOREIGN PATENT DOCUMENTS

| AT | 410007 | 1/2003 |
| AT | 509876 | 12/2011 |

(Continued)

OTHER PUBLICATIONS

Chiera et al., "Cap Shielded Ignition System", U.S. Appl. No. 14/664,431, filed Mar. 20, 2015, 22 pages.

(Continued)

*Primary Examiner* — Logan M Kraft
*Assistant Examiner* — Joshua Campbell
(74) *Attorney, Agent, or Firm* — Fish & Richardson P.C.

(57) ABSTRACT

A pre-chamber spark plug that includes a shell, and an end cap attached to the shell. Additionally, the pre-chamber spark plug includes an insulator disposed within the shell. In a particular embodiment, a center electrode has a first portion surrounded by the insulator, and a second portion that extends from the insulator into a pre-chamber. The pre-chamber defined by the shell and end cap. In a further embodiment, a ground electrode is attached to the shell. In particular embodiments, the ground electrode is tubular in shape and includes an inner spark surface ring spaced in surrounding relation to the center electrode to create a spark gap, an outer ring attached to the shell, and a plurality of rounded spokes connecting the inner and outer rings. In a particular embodiment, the ground and center electrodes accommodate attachment of precious metal alloys to increase electrode surface life.

9 Claims, 6 Drawing Sheets

Related U.S. Application Data (60) Provisional application No. 61/416,588, filed on Nov. 23, 2010.

(58) Field of Classification Search
USPC .......................... 123/256, 445; 313/138–140
See application file for complete search history.

(56) References Cited

U.S. PATENT DOCUMENTS

| | | | |
|---|---|---|---|
| 1,242,375 A | 10/1917 | Robinson | |
| 1,253,570 A | 1/1918 | Berry | |
| 1,320,115 A | 10/1919 | Bloomhuff et al. | |
| 1,322,493 A | 11/1919 | Little | |
| 1,325,439 A * | 12/1919 | Dinger | H01T 13/32 313/138 |
| 1,360,294 A | 11/1920 | Hill | |
| 1,361,347 A | 12/1920 | Nighswander | |
| 1,361,580 A | 12/1920 | Herz | |
| 1,538,750 A | 5/1925 | Scognamillo | |
| 1,594,773 A | 8/1926 | French | |
| 1,596,240 A | 8/1926 | Dikeman | |
| 1,611,856 A | 12/1926 | Farnsworth | |
| 1,700,603 A | 1/1929 | Vreeland et al. | |
| 1,732,827 A | 10/1929 | Adam | |
| 1,748,338 A | 2/1930 | Georgias | |
| 1,963,801 A | 6/1934 | O'Marra | |
| 2,047,575 A | 7/1936 | Burtnett | |
| 2,127,513 A | 8/1938 | Harper, Jr. | |
| 2,153,598 A | 4/1939 | Steward | |
| 2,208,030 A | 7/1940 | Holmes | |
| 2,231,173 A | 2/1941 | Starr | |
| 2,299,924 A | 10/1942 | Ost | |
| 2,314,128 A | 3/1943 | Coldwell | |
| 2,416,107 A | 2/1947 | Litton | |
| 2,456,080 A | 12/1948 | Wu | |
| 2,487,535 A | 11/1949 | Fernandez | |
| 2,497,862 A | 2/1950 | Chuy | |
| 2,509,538 A | 5/1950 | Sues | |
| 2,586,864 A | 2/1952 | Rose | |
| 2,614,546 A | 10/1952 | Schwarz | |
| 2,673,554 A | 3/1954 | Thaheld | |
| 2,758,576 A | 8/1956 | Schlamann | |
| 2,776,394 A | 1/1957 | Cuny et al. | |
| 2,843,780 A | 7/1958 | Harper, Jr. | |
| 2,895,069 A | 7/1959 | Davis | |
| 2,899,585 A | 8/1959 | Dollenberg | |
| 2,957,099 A | 10/1960 | Dutterer | |
| 3,056,899 A * | 10/1962 | Clayton | H01T 13/54 313/143 |
| 3,230,939 A | 1/1966 | Abramovich | |
| 3,270,722 A | 9/1966 | Springer | |
| 3,300,672 A | 1/1967 | Fisher | |
| 3,665,902 A | 5/1972 | Bloomfield | |
| 3,710,764 A | 1/1973 | Jozlin | |
| 3,718,425 A | 2/1973 | Weyl et al. | |
| 3,911,874 A | 10/1975 | Vincent | |
| 3,911,878 A | 10/1975 | Hofbauer et al. | |
| 3,958,144 A | 5/1976 | Franks | |
| 4,004,413 A | 1/1977 | Ueno | |
| 4,041,922 A | 8/1977 | Abe et al. | |
| 4,091,772 A | 5/1978 | Heater | |
| 4,092,558 A | 5/1978 | Yamada | |
| 4,096,832 A | 6/1978 | Casull | |
| 4,098,232 A | 7/1978 | Gleiter | |
| 4,123,998 A | 11/1978 | Heintzeloman | |
| 4,124,000 A | 11/1978 | Genslak | |
| 4,125,094 A | 11/1978 | Noguchi et al. | |
| 4,143,627 A | 3/1979 | Noguchi | |
| 4,170,968 A | 10/1979 | Noguchi | |
| 4,218,993 A | 8/1980 | Blackburn | |
| 4,232,638 A | 11/1980 | Takahashi | |
| 4,242,990 A | 1/1981 | Scherenberg | |
| 4,248,189 A | 2/1981 | Barber et al. | |
| 4,248,192 A | 2/1981 | Lampard | |
| 4,361,122 A | 11/1982 | Latsch | |
| 4,372,264 A | 2/1983 | Trucco | |
| 4,398,513 A | 8/1983 | Tanasawa | |
| 4,406,260 A | 9/1983 | Burley | |
| 4,416,228 A * | 11/1983 | Benedikt | F02B 19/1009 123/169 EL |
| 4,424,780 A | 1/1984 | Trucco | |
| 4,429,669 A | 2/1984 | Burley | |
| 4,441,469 A | 4/1984 | Wilke | |
| 4,452,189 A | 6/1984 | Latsch et al. | |
| 4,490,122 A | 12/1984 | Tromeur | |
| 4,509,476 A | 4/1985 | Breuser et al. | |
| 4,532,899 A | 8/1985 | Lorts | |
| 4,589,398 A * | 5/1986 | Pate | F02P 9/007 123/594 |
| 4,612,888 A | 9/1986 | Ishida | |
| 4,641,616 A | 2/1987 | Lampard | |
| 4,646,695 A | 3/1987 | Blackburn | |
| 4,744,341 A | 5/1988 | Hareyama et al. | |
| 4,765,293 A | 8/1988 | Gonzalez | |
| 4,795,937 A | 1/1989 | Wagner et al. | |
| 4,854,281 A | 8/1989 | Hareyama et al. | |
| 4,901,688 A | 2/1990 | Kashiwara et al. | |
| 4,930,473 A | 6/1990 | Dietrich | |
| 4,963,784 A | 10/1990 | Niessner | |
| 4,987,868 A | 1/1991 | Richardson | |
| 5,014,656 A | 5/1991 | Leptich et al. | |
| 5,051,651 A | 9/1991 | Kashiwara et al. | |
| 5,067,458 A | 11/1991 | Bailey | |
| 5,076,229 A | 12/1991 | Stanley | |
| 5,085,189 A | 2/1992 | Huang | |
| 5,091,672 A | 2/1992 | Below | |
| 5,105,780 A | 4/1992 | Richardson | |
| 5,107,168 A | 4/1992 | Friedrich et al. | |
| 5,222,993 A | 6/1993 | Crane | |
| 5,224,450 A | 7/1993 | Paul et al. | |
| 5,239,959 A | 8/1993 | Loth et al. | |
| 5,245,963 A | 9/1993 | Sabol et al. | |
| 5,271,365 A | 12/1993 | Oppenheim | |
| 5,369,328 A | 11/1994 | Gruber et al. | |
| 5,408,961 A | 4/1995 | Smith | |
| 5,421,300 A | 6/1995 | Durling et al. | |
| 5,430,346 A | 7/1995 | Johnson | |
| 5,454,356 A | 10/1995 | Kawamura | |
| 5,554,908 A | 9/1996 | Kuhnert et al. | |
| 5,555,862 A | 9/1996 | Tozzi | |
| 5,555,867 A | 9/1996 | Freen | |
| 5,555,868 A | 9/1996 | Neumann | |
| 5,560,326 A | 10/1996 | Merritt | |
| 5,612,586 A | 3/1997 | Benedikt et al. | |
| 5,619,959 A | 4/1997 | Tozzi | |
| 5,623,179 A | 4/1997 | Buhl | |
| 5,632,253 A | 5/1997 | Paul et al. | |
| 5,647,444 A | 7/1997 | Williams | |
| 5,662,181 A | 9/1997 | Williams et al. | |
| 5,678,517 A | 10/1997 | Chen et al. | |
| 5,715,788 A | 2/1998 | Tarr | |
| 5,791,374 A | 8/1998 | Black et al. | |
| 5,799,637 A | 9/1998 | Cifuni | |
| 5,803,026 A | 9/1998 | Merritt | |
| 5,821,675 A | 10/1998 | Suzuki | |
| 5,829,407 A | 11/1998 | Watson | |
| 5,892,319 A | 4/1999 | Rossi | |
| 5,947,076 A * | 9/1999 | Srinivasan | F02B 19/12 123/256 |
| 6,013,973 A | 1/2000 | Sato | |
| 6,060,822 A | 5/2000 | Krupa et al. | |
| 6,064,144 A | 5/2000 | Knoll et al. | |
| 6,095,111 A | 8/2000 | Ueda | |
| 6,129,069 A | 10/2000 | Uitenbroek | |
| 6,129,152 A | 10/2000 | Hosie et al. | |
| 6,130,498 A | 10/2000 | Shimizu et al. | |
| 6,198,209 B1 | 3/2001 | Baldwin et al. | |
| 6,279,550 B1 | 8/2001 | Bryant | |
| 6,302,067 B1 | 10/2001 | Merritt | |
| 6,305,346 B1 | 10/2001 | Ueda et al. | |
| 6,318,335 B2 | 11/2001 | Tomczyk | |
| 6,326,719 B1 | 12/2001 | Boehler et al. | |
| 6,340,013 B1 | 1/2002 | Britton | |
| 6,460,506 B1 | 10/2002 | Nevinger | |

(56) References Cited

U.S. PATENT DOCUMENTS

| | | |
|---|---|---|
| 6,463,890 B1 | 10/2002 | Chomiak |
| 6,495,948 B1 | 12/2002 | Garret, III |
| 6,554,016 B2 | 4/2003 | Kinder |
| 6,574,961 B2 | 6/2003 | Shiraishi |
| 6,595,182 B2 | 7/2003 | Oprea |
| 6,611,083 B2 | 8/2003 | LaBarge et al. |
| 6,670,740 B2 | 12/2003 | Landon, Jr. |
| 6,749,172 B2 | 6/2004 | Kinder |
| 6,830,017 B2 | 12/2004 | Wolf et al. |
| 6,913,092 B2 | 7/2005 | Bourgoyne et al. |
| 7,004,444 B2 | 2/2006 | Kinder |
| 7,007,661 B2 | 3/2006 | Warlick |
| 7,007,913 B2 | 3/2006 | Kinder |
| 7,025,036 B2 | 4/2006 | Lampard |
| 7,086,376 B2 | 8/2006 | McKay |
| 7,100,567 B1 | 9/2006 | Bailey et al. |
| 7,104,245 B2 | 9/2006 | Robinet et al. |
| 7,367,307 B2 | 5/2008 | Lampard |
| 7,370,626 B2 | 5/2008 | Schubert |
| 7,408,293 B2 | 8/2008 | Francesconi et al. |
| 7,409,933 B2 | 8/2008 | Nino |
| 7,438,043 B2 | 10/2008 | Shiraishi |
| 7,615,914 B2 | 11/2009 | Francesconi et al. |
| 7,628,130 B2 | 12/2009 | Johng |
| 7,659,655 B2 | 2/2010 | Tozzi et al. |
| 7,743,753 B2 | 6/2010 | Fiveland |
| 7,762,320 B2 | 7/2010 | Williams |
| 7,848,871 B2 | 12/2010 | Onishi |
| 7,856,956 B2 | 12/2010 | Inoue et al. |
| 7,891,426 B2 | 2/2011 | Williams |
| 7,922,551 B2 | 4/2011 | Tozzi |
| 7,950,364 B2 | 5/2011 | Nerheim |
| 8,033,335 B2 | 10/2011 | Orbell et al. |
| 8,143,772 B2 | 3/2012 | Francesconi |
| 8,181,617 B2 | 5/2012 | Kuhnert et al. |
| 8,261,711 B2 | 9/2012 | Shimoda |
| 8,286,734 B2 | 10/2012 | Hannegan et al. |
| 8,313,324 B2 | 11/2012 | Bulat et al. |
| 8,322,432 B2 | 12/2012 | Bailey et al. |
| 8,353,337 B2 | 1/2013 | Bailey et al. |
| 8,387,587 B2 | 3/2013 | Ogata |
| 8,499,854 B2 | 8/2013 | Mitchell et al. |
| 8,584,648 B2 | 11/2013 | Chiera et al. |
| 8,733,331 B2 | 5/2014 | McAlister |
| 8,757,129 B1 | 6/2014 | Hill |
| 8,800,536 B2 | 8/2014 | Plata |
| 8,839,762 B1 | 9/2014 | Chiera et al. |
| 8,857,405 B2 | 10/2014 | Attard |
| 8,890,396 B2 | 11/2014 | Ernst et al. |
| 8,924,136 B2 | 12/2014 | Nakamoto |
| 8,925,518 B1 | 1/2015 | Riley |
| 9,172,216 B2 | 10/2015 | Ernst |
| 2001/0050069 A1 | 12/2001 | Oprea |
| 2003/0196634 A1 | 10/2003 | Lausch |
| 2004/0061421 A1 | 4/2004 | Morita et al. |
| 2004/0100179 A1 | 5/2004 | Boley et al. |
| 2004/0123849 A1 | 7/2004 | Bryant |
| 2004/0177837 A1 | 9/2004 | Bryant |
| 2005/0000484 A1 | 1/2005 | Schultz et al. |
| 2005/0051130 A1 | 3/2005 | Lampard |
| 2005/0092285 A1 | 5/2005 | Klonis et al. |
| 2005/0172929 A1 | 8/2005 | Strauss |
| 2005/0211217 A1 | 9/2005 | Boley et al. |
| 2005/0224606 A1 | 10/2005 | Dingle |
| 2005/0279321 A1 | 12/2005 | Crawford |
| 2006/0005803 A1 | 1/2006 | Robinet et al. |
| 2006/0278195 A1 | 12/2006 | Hotta |
| 2007/0069617 A1 | 3/2007 | Tozzi et al. |
| 2007/0151540 A1 | 7/2007 | Takahashi et al. |
| 2007/0169737 A1 | 7/2007 | Gong et al. |
| 2007/0236122 A1 | 10/2007 | Borror |
| 2007/0261672 A1 | 11/2007 | Lippert |
| 2008/0017165 A1 | 1/2008 | Schubert |
| 2008/0168963 A1 | 7/2008 | Gagliano |
| 2008/0257301 A1 | 10/2008 | Hotta |
| 2009/0236144 A1 | 9/2009 | Todd et al. |
| 2009/0241896 A1 | 10/2009 | Fiveland |
| 2009/0309475 A1 * | 12/2009 | Tozzi .................... H01T 13/467 313/143 |
| 2010/0132660 A1 | 6/2010 | Nerheim |
| 2010/0133977 A1 | 6/2010 | Kato |
| 2010/0147259 A1 | 6/2010 | Kuhnert et al. |
| 2010/0192909 A1 | 8/2010 | Ikeda |
| 2011/0036638 A1 | 2/2011 | Sokol et al. |
| 2011/0062850 A1 | 3/2011 | Tozzi |
| 2011/0065350 A1 | 3/2011 | Burke |
| 2011/0089803 A1 | 4/2011 | Francesconi |
| 2011/0148274 A1 | 6/2011 | Ernst |
| 2011/0297121 A1 | 12/2011 | Kraus et al. |
| 2011/0308489 A1 | 12/2011 | Herden |
| 2011/0320108 A1 | 12/2011 | Morinaga |
| 2012/0000664 A1 | 1/2012 | Nas et al. |
| 2012/0013133 A1 | 1/2012 | Rios, III et al. |
| 2012/0064465 A1 | 3/2012 | Borissov et al. |
| 2012/0103302 A1 | 5/2012 | Attard |
| 2012/0118262 A1 | 5/2012 | Johnson |
| 2012/0125279 A1 | 5/2012 | Hampson et al. |
| 2012/0125287 A1 | 5/2012 | Chiera et al. |
| 2012/0125636 A1 | 5/2012 | Linde et al. |
| 2012/0240890 A1 | 9/2012 | Johng |
| 2012/0299459 A1 | 11/2012 | Sakakura |
| 2012/0310510 A1 | 12/2012 | Imamura |
| 2013/0000598 A1 | 1/2013 | Tokuoka |
| 2013/0042834 A9 | 2/2013 | Chiera et al. |
| 2013/0047954 A1 | 2/2013 | McAlister |
| 2013/0055986 A1 | 3/2013 | Tozzi et al. |
| 2013/0099653 A1 | 4/2013 | Ernst |
| 2013/0139784 A1 | 6/2013 | Pierz |
| 2013/0160734 A1 | 6/2013 | Redtenbacher et al. |
| 2013/0179050 A1 | 7/2013 | Munshi |
| 2013/0192896 A1 | 8/2013 | Bailey et al. |
| 2013/0220269 A1 | 8/2013 | Woo et al. |
| 2014/0026846 A1 | 1/2014 | Johnson |
| 2014/0032081 A1 | 1/2014 | Willi et al. |
| 2014/0076274 A1 | 3/2014 | Tozzi et al. |
| 2014/0083391 A1 | 3/2014 | Gruber |
| 2014/0102404 A1 | 4/2014 | Sotiropoulou et al. |
| 2014/0137840 A1 | 5/2014 | McAlister |
| 2014/0144406 A1 | 5/2014 | Schock |
| 2014/0165980 A1 | 6/2014 | Chiera et al. |
| 2014/0190437 A1 | 7/2014 | Chiera et al. |
| 2014/0209057 A1 | 7/2014 | Pouring |
| 2014/0261294 A1 | 9/2014 | Thomassin |
| 2015/0020769 A1 | 1/2015 | Huang |
| 2015/0040845 A1 | 2/2015 | Chiera et al. |
| 2015/0068489 A1 | 3/2015 | Bunce |
| 2015/0075506 A1 | 3/2015 | Ishida |
| 2015/0128898 A1 | 5/2015 | Osaka |
| 2015/0167576 A1 | 6/2015 | Glugla et al. |
| 2015/0260131 A1 | 9/2015 | Riley |
| 2015/0267631 A1 | 9/2015 | Miyamoto |
| 2015/0354481 A1 | 12/2015 | Geckler |
| 2016/0010538 A1 | 1/2016 | Suzuki |
| 2016/0017845 A1 | 1/2016 | Huang |
| 2016/0024994 A1 | 1/2016 | Engineer |
| 2016/0047323 A1 | 2/2016 | Suzuki |
| 2016/0053668 A1 | 2/2016 | Loetz |

FOREIGN PATENT DOCUMENTS

| | | | |
|---|---|---|---|
| CA | 1010329 | 5/1977 | |
| CA | 2320415 | 3/2001 | |
| CH | 173499 | 11/1934 | |
| CN | 2825995 | 10/2006 | |
| CN | 101076929 A | 11/2007 | |
| CN | 201187370 Y | 1/2009 | |
| CN | 203218710 | 9/2013 | |
| CN | 203434440 | 2/2014 | |
| CN | 104421049 A | 3/2015 | |
| DE | 31 20 007 | 12/1982 | |
| DE | 3230793 | 2/1984 | |
| DE | 3300945 A1 * | 7/1984 | ............ H01T 13/54 |
| DE | 3300945 A1 * | 7/1984 | .......... F02B 19/1004 |
| DE | 3913665 | 10/1990 | |

(56) References Cited

FOREIGN PATENT DOCUMENTS

| | | | |
|---|---|---|---|
| DE | 4422939 | 1/1996 | |
| DE | 19624965 | 1/1998 | |
| DE | 10143209 | 6/2002 | |
| DE | 101 44 976 | 4/2003 | |
| DE | 10155404 | 5/2003 | |
| DE | 102010004851 | 6/2011 | |
| DE | 102011006597 A1 | 3/2012 | |
| DE | 102012021842 B4 | 9/2014 | |
| EP | 0069993 | 1/1983 | |
| EP | 0216027 A1 | 4/1987 | |
| EP | 0 675 272 | 10/1995 | |
| EP | 0971107 | 1/2000 | |
| EP | 1026800 A2 | 8/2000 | |
| EP | 1028506 A1 | 8/2000 | |
| EP | 0937196 | 9/2000 | |
| EP | 1043485 A1 | 10/2000 | |
| EP | 1265329 | 12/2002 | |
| EP | 1556592 | 10/2003 | |
| EP | 1454040 A1 | 9/2004 | |
| EP | 1556932 | 7/2005 | |
| EP | 1701419 | 9/2006 | |
| EP | 1701419 A1 * | 9/2006 | ............. F02B 19/12 |
| FI | FI 121759 | 3/2011 | |
| FI | FI 122501 | 2/2012 | |
| FR | 577766 A | 9/1924 | |
| FR | 764079 A | 5/1934 | |
| FR | 985788 A | 7/1951 | |
| FR | 2071129 A5 | 9/1971 | |
| FR | 2131938 A2 | 11/1972 | |
| FR | 2131938 B2 | 8/1979 | |
| FR | 2846042 | 4/2004 | |
| GB | 119419 A * | 10/1918 | ............. H01T 13/54 |
| GB | 588074 | 5/1947 | |
| JP | 50077738 | 6/1975 | |
| JP | S5252013 | 4/1977 | |
| JP | S5287517 | 7/1977 | |
| JP | S5415105 | 1/1979 | |
| JP | 55142931 | 11/1980 | |
| JP | 57-018283 | 1/1982 | |
| JP | 58162719 | 9/1983 | |
| JP | S58187579 | 11/1983 | |
| JP | H02148588 | 12/1990 | |
| JP | 03-011575 | 1/1992 | |
| JP | 4133281 | 5/1992 | |
| JP | 4262388 | 9/1992 | |
| JP | H07208170 | 8/1995 | |
| JP | 08-260970 | 10/1996 | |
| JP | 09166024 | 6/1997 | |
| JP | 2005264815 | 9/2005 | |
| JP | 2008-504649 | 2/2006 | |
| JP | 2006329092 | 12/2006 | |
| JP | 2010118236 A * | 5/2010 | |
| JP | 2011222205 A | 11/2011 | |
| KR | 20140117152 A | 10/2014 | |
| NL | 1701419 A1 * | 9/2006 | ............. F02P 13/00 |
| RU | 2116474 | 7/1998 | |
| SU | 968493 | 10/1982 | |
| SU | 1370269 | 1/1988 | |
| WO | WO 1987/07777 | 12/1987 | |
| WO | WO 1991/06142 | 5/1991 | |
| WO | WO 1992/02718 | 2/1992 | |
| WO | WO 2004/036013 | 4/2004 | |
| WO | WO 2004/036709 | 4/2004 | |
| WO | WO 2004/107518 | 12/2004 | |
| WO | WO 2006/011950 | 2/2006 | |
| WO | WO 2009/060119 A1 | 5/2009 | |
| WO | WO 2009/109694 A2 | 9/2009 | |
| WO | WO 2009/130376 A1 | 10/2009 | |
| WO | WO 2010/072519 | 7/2010 | |
| WO | WO 2011/031136 | 3/2011 | |
| WO | WO 2011/085853 | 7/2011 | |
| WO | WO 2011/101541 | 8/2011 | |
| WO | WO 2011/128190 | 10/2011 | |
| WO | WO 2011/151035 | 12/2011 | |
| WO | WO 2012/21914 A1 | 2/2012 | |
| WO | WO 2012/091739 | 7/2012 | |
| WO | 2014/201030 | 12/2014 | |
| WO | 2015/138987 A1 | 9/2015 | |

OTHER PUBLICATIONS

Office Action issued in Chinese Application No. 201480027881.4 dated Nov. 2, 2016, 5 pages.

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).

Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.

McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.

Dale, J.D. et al., "Enhanced Ignition for I. C. Engines With Premixed Charge," Lawrence Berkeley Laboratory, Society of Automotive Engineers Annual Congress, Oct. 1980, 52 pages.

"New Spark Plug Concepts for Modern-Day Gasoline Engines," Beru Aktiengesellschaft, MTZ vol. 68, Feb. 2007, 8 pages.

BorgWarner BERU Systems Pre-Chamber Technology, 1 page.

BorgWarner BERU Systems, BERU Industrial Spark Plugs, Feb. 2012, 48 pages.

Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.

Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.

Jessica Adair et al; Knock Characterization Using Ionization Detection; GMRC Gas Machinery Conference; Oklahoma City, Oklahoma; Oct. 2006; pp. 1-23.

Hironori Osamura, Development of Long Life and High Ignitability iridium Spark Plug, Technical Paper, Seoul 2000 FISITA World Automotive Congress; Jun. 12-15, 2000 Seoul, Korea; 6 pages.

Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.

"Wartsila 34SG Engine Technology for Compressor Drive," Wartsila Engines, Wartsila Corporation 2009, 16 pages.

Office Action issued in Japanese Application No. 2011-189180 dated Aug. 13, 2013; 4 pages.

Office Action issued in Japanese Application No. 2011-189180 dated Feb. 12, 2014; 4 pages.

Authorized Officer Martinez Cebollada, PCT International Search Report and Written Opinion of the International Searching Authority, PCT/US2014/041758, dated Sep. 10, 2014, 11 pages.

Japan Patent Officer Tomoyuki Ideno, Notice of Reason for Rejection, Notice No. 29005, Japanese Patent Application No. 2014-091265, dated Jan. 27, 2015, 3 pages.

Bosch, Spark Plugs Technical Information, published on or before Nov. 28, 2014, 28 pages.

Notice of Allowance issued in Japanese Application No. 2016-026271 dated Aug. 1, 2017; 4 pages.

Second Office Action issued in Chinese Application No. 201480027881.4 dated Jul. 21, 2017; 10 pages.

German Office Action in German Application No. 10 2011 053 530.6, dated Jul. 26, 2018, 5 pages, with Machine Translation.

* cited by examiner

PRE-CHAMBER SPARK PLUG WITH TUBULAR ELECTRODE AND METHOD OF MANUFACTURING SAME

CROSS-REFERENCE TO RELATED PATENT APPLICATIONS

This patent application is a divisional of and claims the benefit of priority to U.S. patent application Ser. No. 13/042,599, filed Mar. 8, 2011 which claims the benefit of priority to U.S. Provisional Patent Application No. 61/416,588, filed Nov. 23, 2010, the entire teachings and disclosure of which are incorporated herein by reference thereto.

FIELD OF THE INVENTION

This invention generally relates to spark plugs for internal combustion engines, and, more particularly, to spark plugs having a pre-combustion chamber, or pre-chamber.

BACKGROUND OF THE INVENTION

Engines operating on gaseous fuels, such as natural gas, are commonly supplied with a lean fuel mixture, which is a mixture of air and fuel containing a excess air beyond that which is "chemically correct" or stoichiometric. The lean fuel mixture often results in poor combustion such as misfires, incomplete combustion and poor fuel economy and often efforts to improve combustion lead to detonation. One factor that can lead to such events is the poor ability of conventional spark plugs to effectively and consistently ignite a lean fuel mixture in the cylinder of the operating engine. More effective combustion of lean fuel mixtures can be achieved using a pre-combustion chamber, or pre-chamber.

Pre-chamber spark plugs are typically used to enhance the lean flammability limits in lean burn engines such as natural gas lean burn engines or automotive lean gasoline engines. In known pre-chamber spark plugs, such as the pre-chamber spark plug disclosed in U.S. Pat. No. 5,554,908, the spark gap is confined in a cavity having a volume that may represent a relatively small fraction of the total engine cylinder displacement. In some embodiments, a portion of the cavity is shaped as a dome and has various tangential induction/ejection holes. During operation, as the engine piston moves upward during the compression cycle, air/fuel mixture is forced through the induction holes in the pre-chamber. The orientation of the holes may determine the motion of the air/fuel mixture inside of the pre-chamber cavity and the reacting jet upon exiting the pre-chamber.

When the burn rate of the air/fuel mixture in the pre-chamber cavity is increased, the result is more highly penetrating flame jets into the engine combustion chamber. These flame jets improve the ability of the engine to achieve a more rapid and repeatable flame propagation in the engine combustion chamber at leaner air/fuel mixtures. Many conventional pre-chamber spark plugs have non-repeatable and unpredictable performance characteristics which may lead to a higher than desired coefficient of variation (COV) and misfire, which is a measure of roughness. Further, many conventional pre-chamber spark plugs are sensitive to manufacturing variation.

One of the challenges in spark plug design is to create a plug capable of achieving a repeatable and controllable ignition delay time during the combustion process, in spite of the fact that, in internal combustion engines, the fresh charge will not usually be homogeneous or repeatable from cycle to cycle in many aspects (e.g., equivalence ratio, turbulence, temperature, residuals). It is also desirable to have a spark plug that is relatively insensitive to variations in manufacturing or components or the assembly thereof.

Embodiments of the invention provide such a spark plug. These and other advantages of the invention, as well as additional inventive features, will be apparent from the description of the invention provided herein.

BRIEF SUMMARY OF THE INVENTION

In one aspect, embodiments of the invention provide a pre-chamber spark plug that includes a shell, and an end cap attached to the shell, a center electrode and ground electrode. Additionally, the pre-chamber spark plug includes an insulator disposed within the shell. In a particular embodiment, the center electrode has a first portion surrounded by the insulator, and a second portion that extends from the insulator into a pre-chamber. The pre-chamber volume is defined by the shell and end cap. In a further embodiment, the ground electrode is attached to the shell. In particular embodiments, the ground electrode includes an inner ring spaced in surrounding relation to the center electrode, an outer ring attached to the shell, and a plurality of spokes connecting the inner and outer rings. In a particular embodiment, the ground electrode has a tubular shape which serves to protect the incoming central hole flow passing through the gap between the center and ground electrode from disturbances from the flow entering via lateral holes. The tubular shape also directs the lateral hole flow behind the ground electrode at the periphery to join the spark kernel as it exits the gap. Additionally, the center electrode has an aerodynamic shape which improves the flow stream line through the gap from the center hole.

In another aspect, embodiments of the invention provide a method of facilitating combustion in an internal combustion engine. The method includes igniting an air/fuel mixture in a pre-chamber of a pre-chamber spark plug. In a particular embodiment, igniting an air/fuel mixture in a pre-chamber includes providing a first port to permit the flow of a first amount of air/fuel mixture into a gap between the center and ground electrode with a predominant backward flow direction from the front chamber of the pre-chamber, and igniting the air/fuel mixture in the gap, wherein the ignition produces a flame kernel. Further, the method includes causing the flame kernel to be transported to a back chamber of the pre-chamber, and providing a second port to permit the flow of a secondary (Lateral) amount of air/fuel mixture into the front chamber, such that the secondary amount of air/fuel mixture flows to the back chamber to be ignited by the flame kernel. The secondary flow may also have swirl which serves to spread the developing flame in the back chamber in the azimuthal direction—such that azimuthal uniformity is improved. The ignition of the first and second amounts of air/fuel mixture creates a pressure rise in the pre-chamber which causes a flame jet to issue from the first and second ports. The port hole size and angle can be optimized to maximize the flame jet velocity and penetration into the main chamber, thus enhancing combustion in the main chamber. The hole size controls both the inflow and outflow and thus is optimized to achieve the desired engine specific ignition delay time, jet velocity, and flame jet penetration and thus main chamber combustion rates.

In yet another aspect, embodiments of the invention provide a pre-chamber spark plug that includes a shell, and an end cap attached to the shell. Additionally, the pre-chamber spark plug includes an insulator disposed within the shell. In a particular embodiment, a center electrode has a first portion surrounded by the insulator, and a second portion that extends from the insulator into a pre-chamber. The pre-chamber defined by the shell and end cap. In a further embodiment, a ground electrode is attached to the shell. In particular embodiments, the ground electrode includes an inner ring spaced in surrounding relation to the center electrode, and a plurality of spokes projecting radially outward from the inner ring which hold the ring in place. In an embodiment, the end of each spoke is attached to the shell.

Further, in another aspect, embodiments of the invention provide a method of manufacturing a pre-chamber spark plug. The method includes attaching a ground electrode to the shell. In a particular embodiment, the ground electrode comprises a tubular electrode. In at least one embodiment, the tubular electrode has an inner ring located in surrounding relation to the center electrode.

The method also includes attachment of precious metal to the center electrode and to the ground electrode which represents the sparking surface. The method also includes the manufacturing process whereby the gap between the center electrode and the ground electrode is created with a gapping tool during manufacturing and assembly such that the gap is determined accurately during manufacturing and assembly—thus reducing the need for re-gapping after fabrication. In one embodiment, the gapping tool is inserted between the center electrode and the ground electrode prior to final attachment of the ground electrode to the shell. This gap is best maintained if this is the final heating step in the process.

The particular arrangement of a tubular ground electrode with a concentric center electrode having created conditions for flow through the gap to the back side of the ground electrode can be accomplished in a pre-chamber in the head design which does not require the shell of the spark plug, where the cylinder head pre-chamber takes the place of the spark plug shell wall. Additionally, fuel may be added to either the pre-chamber spark plug or the pre-chamber in the head device to further extend the lean operating limit. These are referred to as "fuel-fed" devices.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

To address the issues of a repeatable and controllable ignition delay time during the combustion process, which results in both a more efficient combustion process and longer life for the spark plug, a pre-chamber spark plug has been developed that incorporates a tubular electrode to control the flame kernel development, ignition delay time, flame jet evolution and improves engine performance. The delay time is the period between the spark and that time when the combustion affects a volume sufficient to increase the pressure in the pre-chamber.

Figure 1:
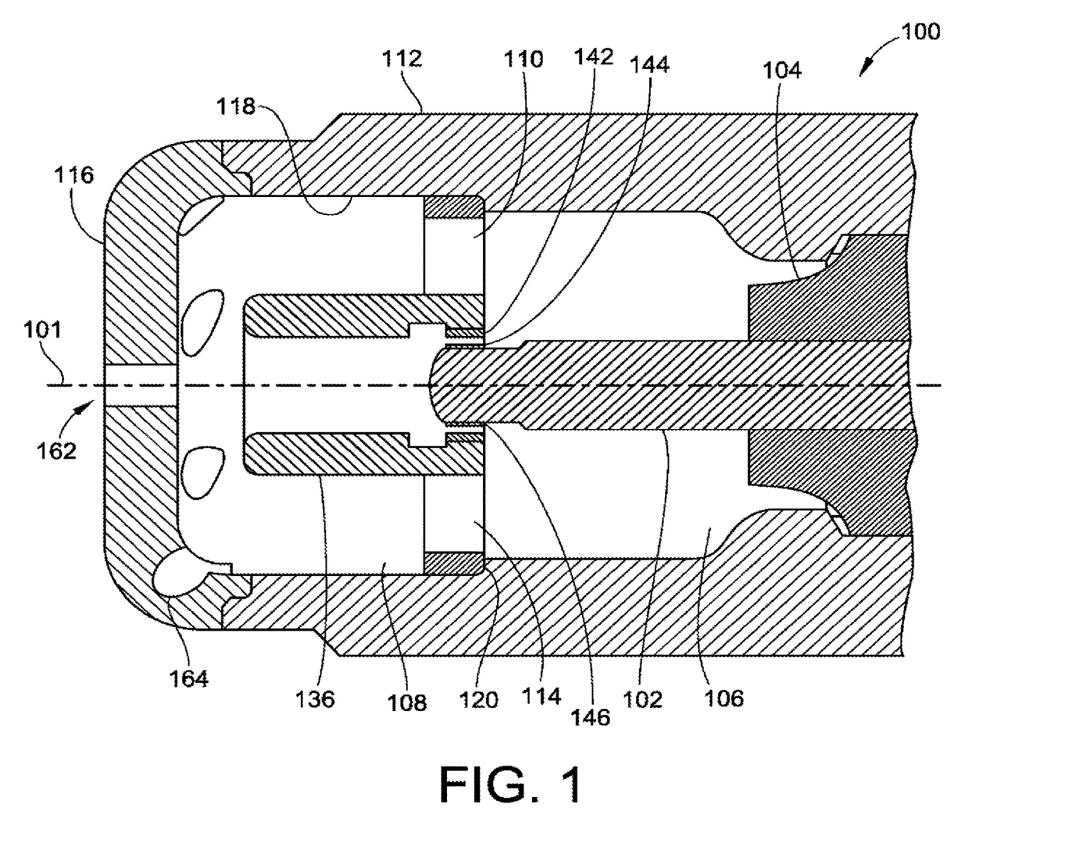
FIG. 1 illustrates a cross-sectional view of a portion of a pre-chamber spark plug, according to an embodiment of the invention.

FIG. 1 illustrates a cross-sectional view of a portion of a pre-chamber spark plug 100, according to an embodiment of the invention. The pre-chamber spark plug 100 has a longitudinal axis 101 and a center electrode 102 that extends along the longitudinal axis 101, and further extends from an insulator 104 into a pre-combustion chamber that is divided into a back chamber 106 and a front chamber 108. A tubular electrode 110, which serves as the ground electrode, is disposed inside a shell 112. In embodiments of the invention, the shell 112 is made from a high-strength metal capable of withstanding exposure to high temperatures. The disk portion 114 of the tubular electrode 110 separates the back chamber 106 from the front chamber 108. An end cap 116 defines an end of the pre-chamber volume of the spark plug 100 and also a boundary of the front chamber 108. As shown in FIG. 1, in a particular embodiment of the invention, an interior surface 118 of the shell 112 may have a stepped portion 120 such that the tubular electrode 110 can seat on the stepped portion 120 during assembly of the pre-chamber spark plug 100.

Figure 2:
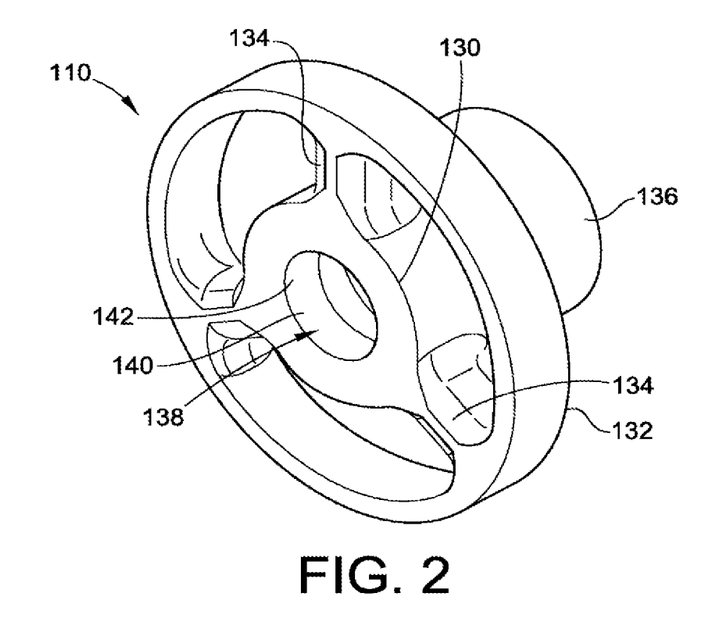
FIG. 2 is a perspective view of the tubular electrode, constructed in accordance with an embodiment of the invention.

FIG. 2 is a perspective view of the tubular electrode 110, constructed in accordance with an embodiment of the invention. The tubular electrode 110 has an inner ring 130 and an outer ring 132 imbedded within the tubular ground electrode 110. In the embodiment of FIG. 2, the inner ring 130 and outer ring 132 are connected by three spokes 134. Extending from the inner ring 130 in the center portion of the tubular electrode 110 is a tubular inner ring, or velocity control shroud 136. In a particular embodiment of the invention, as illustrated in FIG. 1, the velocity control shroud 136 extends away from the disk portion 114 in one direction into the front chamber 108. A central opening 138 extends through the inner ring 130 and the velocity control shroud 136.

Still referring to FIG. 2, in an embodiment of the invention, the tubular electrode 110 is made from a copper alloy, a nickel alloy, or some other relatively highly-conductive metal. In a particular embodiment of the invention, a precious metal is attached to, or deposited on, an inner surface 140 of the inner ring 130. Precious metals are typically used on spark plug electrodes to increase the life of the spark plug and improve performance. The precious metals chosen for this application exhibit a high melting point, high conductivity, and increased resistance to oxidation. In embodiments of the invention, a first electrode surface ring 142 of, for example, platinum or alloys thereof, rhodium or alloys thereof, tungsten or alloys thereof, iridium or alloys thereof lines the inner surface 140 of the inner ring 130. In alternate embodiments, the inner surface 140 of the inner ring 130 is lined with an iridium-rhodium alloy or a nickel alloy. Referring again to FIG. 1, in particular embodiments of the invention, a second electrode surface ring 144, of the same or similar material as the first electrode surface ring 142, is attached to, or deposited on, an exterior surface 146 of the center electrode 102.

Referring again to FIG. 2, the spokes 134 may be square-edged for easy manufacturing or may have a curved contour so as to provide less resistance to gases flowing through the spaces between the spokes 134. In alternate embodiments of the invention, there may be a greater or fewer number of spokes connecting the inner ring 130 and outer ring 132. In an alternate embodiment of the invention, the tubular electrode 110 does not have an electrode surface ring made from a precious metal. In an exemplary embodiment, the entire tubular electrode 110 is made from a single material such as a nickel alloy.

Figure 3:
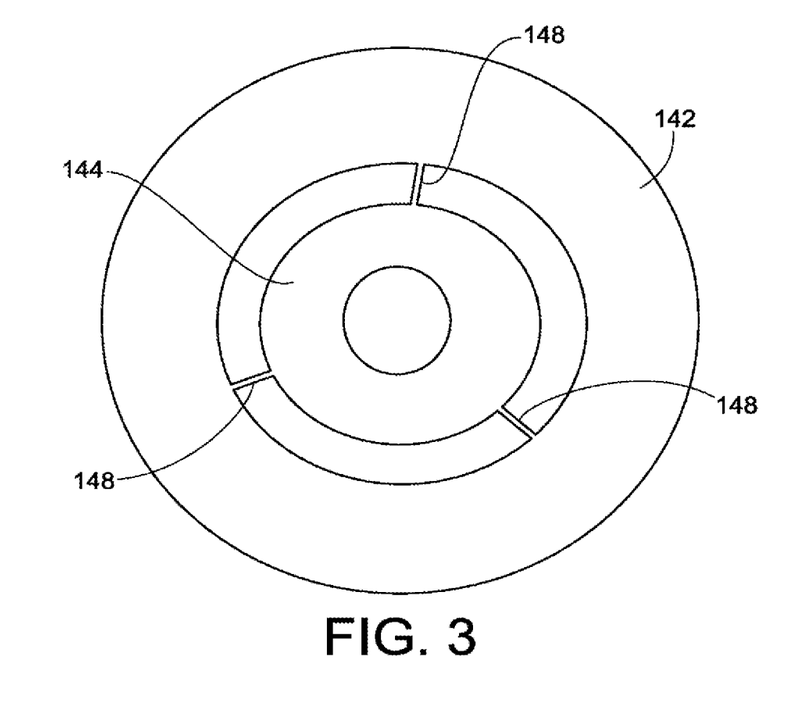
FIG. 3 illustrates an exemplary embodiment of the first and second electrode surface rings, in accordance with an embodiment of the invention.

The tubular electrode 110 may be cast or machined substantially as a single piece, though the first electrode surface ring may be a separate ring of some type of precious metal or similarly suitable metal. It is also envisioned that the tubular electrode 110 can be made from powdered metal, wherein the powdered metal is sintered or injection molded. Other manufacturing techniques in which the powdered metal is melted rather than sintered are also envisioned. In at least one embodiment, the first and second electrode surface rings 142, 144 are made from, for example, cylindrical or rectangular bar stock, which is cut to length and formed into a ring. In an alternate embodiment, the first and second electrode surface rings 142, 144 are made from flat sheet stock, and a punch is used to produce a number of electrode surface rings 142, 144 from a single flat sheet. FIG. 3 shows an exemplary embodiment of the first and second electrode surface rings 142, 144 in which the two electrode surface rings are punched in a single operation such that the first and second electrode surface rings 142, 144 are attached via three tabs 148. In a particular embodiment, both the first and second electrode surface rings 142, 144 are assembled to the tubular electrode 110 with tabs 148 in place to maintain the correct spacing between the electrode surface rings 142, 144. The tabs 148 are removed after the first electrode surface ring 142 is attached to the tubular electrode 110, and after the second electrode surface rings 144 is attached to the center electrode 102. The ring 142 may also be cut into one or more semi-circular sections to accommodate fabrication, assembly, attachment and/or thermal expansion.

Figure 4:
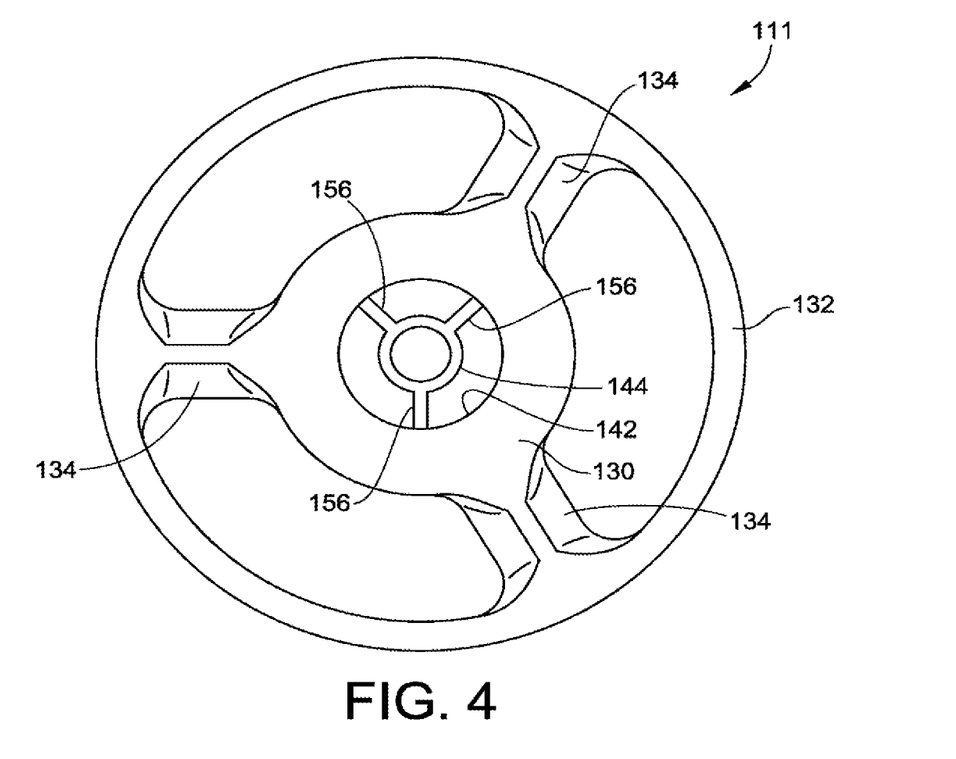
FIG. 4 is a plan view of the tubular electrode, constructed in accordance with alternate an embodiment of the invention.

An alternate embodiment of the tubular electrode is illustrated in FIG. 4. In this embodiment, the inner ring 130, outer ring 132, spokes 134 and velocity control shroud 136 are substantially the same as for tubular electrode 110. However, tubular electrode 111 includes the second electrode surface ring 144 attached to the first electrode surface ring 142 by three tabs 156. As such, the correct spacing between the first and second electrode surface rings 142, 144 is maintained until assembly is completed. After assembly, the tabs 156 can be removed mechanically or by electron beam or water jet or similar method. However, in a particular embodiment, the tabs 156 can be made, for example, from a material with a substantially lower melting point that the other materials in the tubular electrode 111 or the second electrode surface ring 144. This allows for the tabs 156 to be removed by burning or melting after assembly of the tubular electrode 111 to the pre-chamber spark plug 100.

There are several methods by which the first electrode surface ring 142 can be attached to the tubular electrode 110. In a particular embodiment of the invention, the tubular electrode 110 is cast around the first electrode surface ring 142. In an alternate embodiment, a separate metal ring with a layer of precious metal or similarly suitable metal attached to an inner surface of the metal ring is assembled to the inner ring 130 of the tubular electrode 110.

Figure 5:
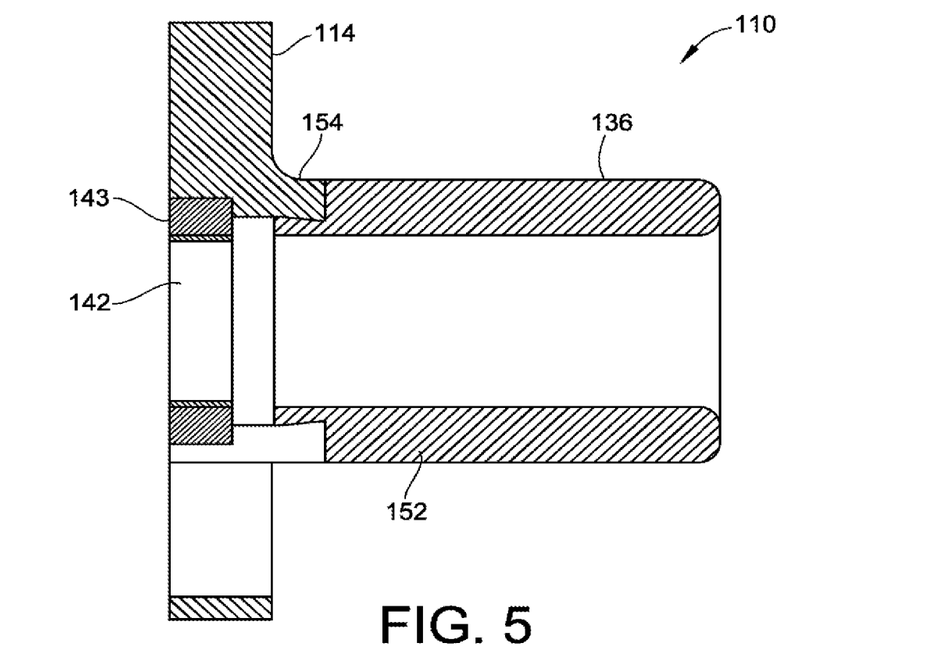
FIG. 5 is a cross-sectional view of the tubular electrode having a first electrode surface ring on a substrate material, in accordance with an embodiment of the invention.

For example, the electrode surface ring material can be deposited on, for example, a powdered metal substrate, using physical or chemical vapor deposition. For example, the powdered metal substrate may be a hollow cylinder and the electrode surface ring material can be deposited on the interior surface of the hollow cylinder. The cylinder could be sliced into a number of first electrode surface rings 142. If the same material is deposited on the outside of a smaller hollow cylinder, it could be sliced into a number of second electrode surface rings 144. Made in this fashion, the first electrode surface rings 142 could be inserted into the central opening of the tubular electrode 110 and welded or brazed in place. FIG. 5 shows a cross-sectional view of tubular electrode 110 having a first electrode surface ring 142 attached or deposited on a substrate material 143, for example a nickel alloy or highly conductive alloy. In a particular embodiment, the weld is a tack weld in one spot or a few select spots to allow for some relative movement due to the differing rates of thermal expansion for the different materials. Using the methods described above to add the precious metal to the tubular electrode 110 allows for the fabrication of the pre-chamber spark plug 100 with less of the precious metal than typically used in conventional pre-chamber spark plugs, thus making the pre-chamber spark plug 100 less expensive to manufacture than many conventional pre-chamber spark plugs.

In a further embodiment, the tubular electrode 110 can be assembled from separate components. The embodiment of FIG. 5 also shows a cross-sectional view of a particular embodiment of the tubular electrode 110 having a separate disk portion 114 and velocity control shroud 136. In at least one embodiment, the velocity control shroud 136 has a notched portion 152 at one end, and the notched portion is press fit into an annular receiving portion 154 in the disk portion 114. In a further embodiment, the annular receiving portion 154 could be pressed inward into the notched portion 152 of the velocity control shroud 136 holding it in place. In a further embodiment, the notched portion 152 includes a annular protrusion about its circumference that fits into a divot in the annular receiving portion 154 of the tubular electrode 110 to improve the attachment between the disk portion 114 and velocity control shroud 136. In alternate embodiment, the notched portion 152 is threaded along with an interior surface of the annular receiving portion 154 such that the velocity control shroud 136 can be threaded into the disk portion 114.

Figure 7:
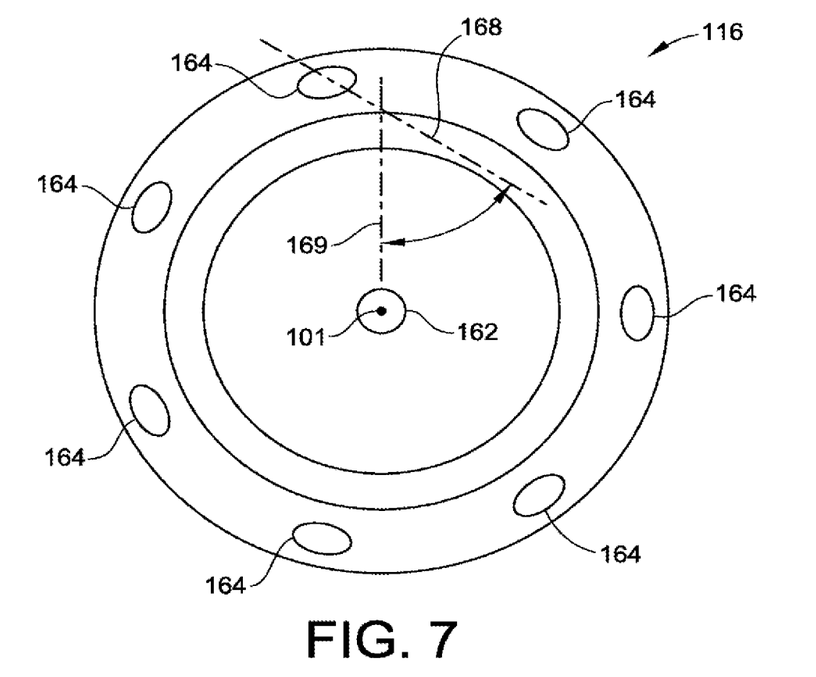
FIG. 7 is an end view of an end cap for the pre-chamber spark plug, according to a particular embodiment of the invention.
Figure 8:
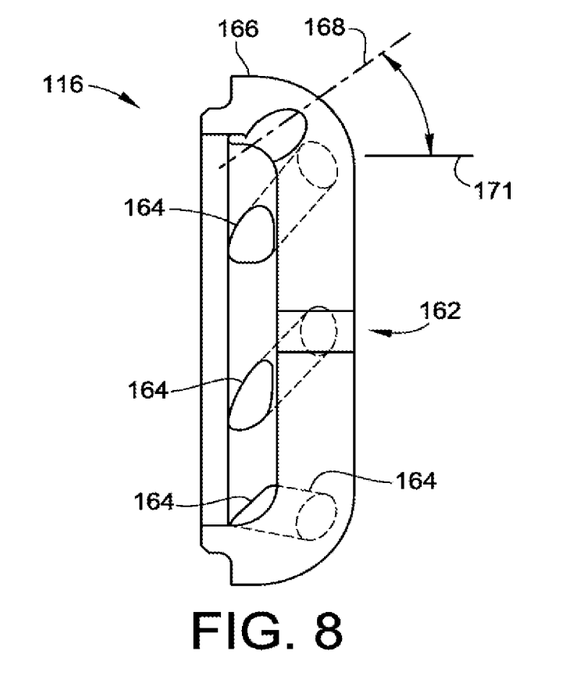
FIG. 8 is a cross-sectional view of the end cap of FIG. 7.

Referring again to FIG. 1, in operation, the air/fuel mixture is drawn into the front chamber 108 of pre-chamber spark plug 100 from the main cylinder of the engine (not shown) through a center hole 162 (see also FIGS. 7 and 8)

in end cap 116, and through a plurality of periphery holes 164 (see also FIGS. 7 and 8). The air/fuel mixture drawn in through the center hole 162 flows through the velocity control shroud 136 to the spark gap between center electrode 102 and tubular electrode 110 where it is ignited by an electric spark. The velocity of the air/fuel mixture causes the initial flame kernel to be transported into the back chamber 106.

The air/fuel mixture drawn in through periphery holes 164 has a swirling motion due to the angled nature of the periphery holes 164. The swirling air/fuel mixture flows past the outside of the velocity control shroud 136 toward the back chamber 106 where it is ignited by the flame kernel from the center hole flow. The turbulence caused by the swirling motion of the air/fuel mixture distributes the growing flame kernel around the back chamber 106 predominantly consuming the fuel in the back chamber 106. This results in a faster burn and a rapid increase in pressure inside the pre-chamber as combustion of the air/fuel mixture proceeds from the back chamber 106 to the front chamber 108. The result is a more complete burn of the air/fuel mixture and, therefore, increased pressure within the pre-chamber. This results in a high-velocity jet of flame through the center hole 162 and through the plurality of periphery holes 164 into the main combustion chamber (not shown).

In this manner, ignition is delayed by the flow of the flame kernel to the back chamber 106. The combustion process starts in the back chamber 106 and must progress through the front chamber 108 before the resultant flames project into the main combustion chamber. Because this increased ignition delay time results in a more complete burn, the process is more repeatable and has less variation, and therefore a lower COV, than in typical conventional pre-chamber spark plugs. An additional benefit of the delay in ignition is that the spark can be initiated sooner in the combustion cycle when the cylinder pressure is lower than would be the case without the ignition delay. Initiating the spark when the cylinder pressure is lower prolongs the life of the pre-chamber spark plug 100.

Further, in configuring the pre-chamber spark plug, the volume of the back chamber 106 behind the tubular electrode 110, and of the front chamber 108 in front of the tubular electrode 110 can be optimized to control the flame kernel development, and thus the ignition delay time. The ratio of volume of the front chamber 108 to that of the back chamber 106 controls the size and penetration of the flame jet that issues from the center hole 162.

Figure 6:
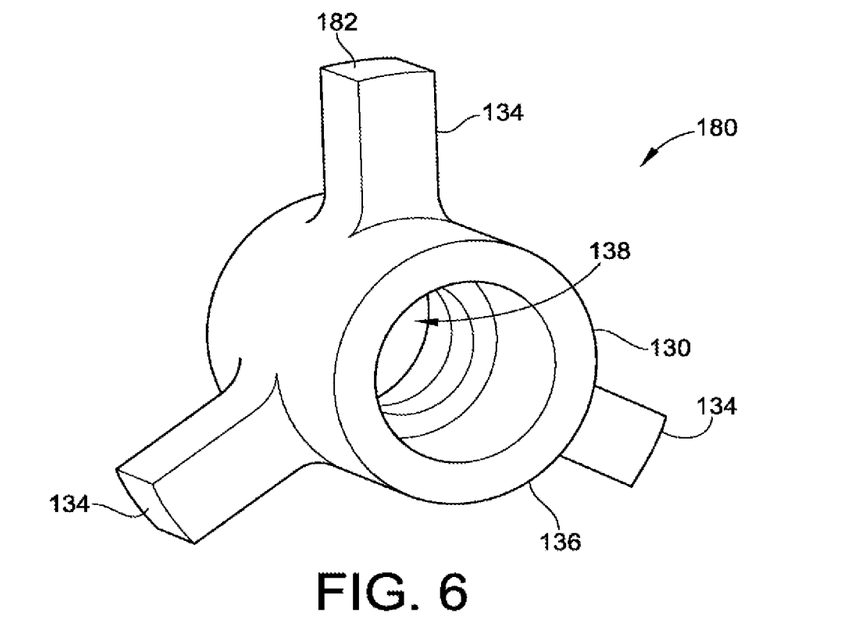
FIG. 6 is a perspective view of a tubular electrode, constructed in accordance with another embodiment of the invention.

FIG. 6 is a perspective view of a tubular electrode 180, constructed in accordance with an embodiment of the invention. Tubular electrode 180 serves as a ground electrode and is similar to tubular electrode 110, except that tubular electrode 180 has no outer ring. Tubular electrode 180 includes the inner ring 130 with a central opening 138. The inner ring 130 extends axially to form the velocity control shroud 136. In the embodiment of FIG. 6, three spokes 134 extend radially outward from the exterior of the inner ring 130. In a particular embodiment, the tubular electrode 180 is assembled to the pre-chamber spark plug 100 by attaching an end 182 of each spoke 134 directly to the shell 112. The attachment may be made by welding, brazing, or the like.

FIGS. 7 and 8 show an end view and a cross-sectional view, respectively, of the end cap 116 for pre-chamber spark plug 100, according to a particular embodiment of the invention. In a particular embodiment, the end cap 116 is cup-shaped such that it protrudes slightly from the end of the shell 112. The end cap 116 has center hole 162 that, in at least one embodiment, is centered around the longitudinal axis 101 of the pre-chamber spark plug 100. The center hole 162 is configured to control the rate of flow of air/fuel mixture into the front chamber 108. The end cap 116 further includes the plurality of periphery holes 164 which may be drilled or formed in a sidewall 166 of the end cap 116. The periphery holes 164 are configured to create a swirling motion of the air/fuel mixture in the pre-combustion chamber. In an embodiment of the invention, the end cap 116 is attached to the shell 112 via welding, brazing, and the like.

FIGS. 7 and 8 illustrate an embodiment of the end cap 116 having seven periphery holes 164 in the sidewall 166, and seven periphery hole axes 168. For the sake of simplicity, only one periphery hole axis 168 is shown in FIG. 7. FIG. 7 shows and end view of end cap 116 that includes an exemplary swirl angle for the periphery holes 164, and further includes the longitudinal axis 101 for pre-chamber spark plug 100 as it would be located, in a particular embodiment, when the end cap 116 is assembled to shell 112. FIG. 8 is a cross-sectional view of the end cap 116 and shows an exemplary penetration angle for the periphery holes 164.

Other embodiments of the end cap 116 may have more or less than seven periphery holes 164. The periphery holes 164 are angled such that none of the periphery hole axes 168 intersect the longitudinal axis 101. As stated above, FIG. 7 illustrates a swirl angle for the periphery holes 164. As shown in FIG. 7, the swirl angle is defined as the angle between the periphery hole axis 168 and a radial line 169 projecting from the center of the end cap 116 through a point on the periphery hole axis 168 midway between the ends the cylinder defined by the corresponding periphery hole 164.

In the embodiment of FIGS. 7 and 8, the swirl angle is 45 degrees but, in alternate embodiments, could be greater or lesser than 45 degrees. FIG. 8 illustrates a penetration angle for the periphery holes 164. As shown in FIG. 8, the penetration angle is defined as the angle between the periphery hole axis 168 and the longitudinal axis 101 or a line 171 parallel to the longitudinal axis 101. During engine operation, when an air-fuel mixture is introduced into the front chamber 108 of the pre-chamber, the angled nature of the periphery holes 164 produces a swirling effect on the air-fuel mixture in the pre-chamber. The exact location (i.e., on the sidewall 166) and configuration (e.g., diameter, angle) of the periphery holes 164 is dependent on the desired flow field and air-fuel distribution within the pre-combustion chamber.

Figure 9:
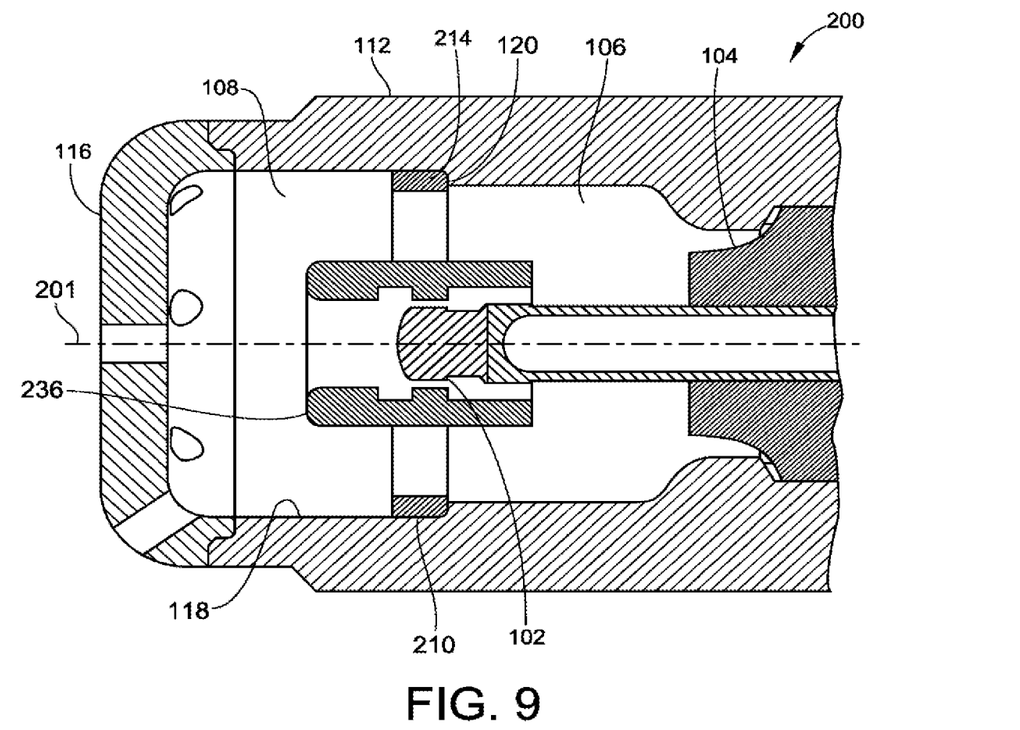
FIG. 9 is a cross-sectional view of a portion of a pre-chamber spark plug, according to a particular embodiment of the invention.

FIG. 9 is a cross-sectional view of a pre-chamber spark plug 200, constructed in accordance with an embodiment of the invention. Pre-chamber spark plug 200 has a longitudinal axis 201. The center electrode 102 that extends along the longitudinal axis 201, and further extends from the insulator 104 into the pre-chamber, divided into back chamber 106 and front chamber 108. A tubular electrode 210, disposed inside shell 112, serves as the ground electrode. The disk portion 214 of the tubular electrode 210 separates the back chamber 106 from the front chamber 108. The end cap 116 defines the end of the pre-chamber spark plug 200 and also a boundary of the front chamber 108. In a particular embodiment of the invention, an interior surface 118 of the shell 112 may have a stepped portion 120 such that the tubular electrode 210 can seat on the stepped portion 120 during assembly of the pre-chamber spark plug 200.

In operation, the pre-chamber spark plug 200 operates in a manner similar to that described above for the operation of pre-chamber spark plug 100. However, it can be seen in FIG. 9 that a tubular inner ring, or velocity control shroud 236 extends axially both into the front chamber 108 and into the back chamber 106. By increasing the length of the velocity control shroud 236, i.e., adding the portion that extends into the back chamber 106, the ignition delay time can be further increased. In this case, the ignition delay time is controlled by the length of the extended back portion of the velocity control shroud 236, and by the flow velocity in the extended back portion of the velocity control shroud 236. The flow velocity in the velocity control shroud 236 is a function of the mass flow through the center port 162. The increased ignition delay time that results from the extended velocity control shroud 236 allows the spark to be initiated even earlier than in the case of pre-chamber spark plug 100. Initiating the spark earlier when cylinder pressure is lower prolongs the life of the spark plug. Such a design also makes it possible to fabricate pre-chamber spark plugs having center and ground electrodes without any precious metal. This reduces the material cost and simplifies substantially the manufacture and assembly of the spark plug.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of facilitating combustion in an internal combustion engine, the method comprising:
   igniting an air/fuel mixture in a pre-chamber of a pre-chamber spark plug, wherein igniting an air/fuel mixture in a pre-chamber comprises:
   permitting flow of a first amount of air/fuel mixture into a front chamber of the pre-chamber through a first port;
   igniting the air/fuel mixture, wherein the ignition produces a flame kernel, with a tubular portion of a ground electrode around a center electrode, the tubular portion suspended in the pre-chamber by a plurality of spokes of the ground electrode, the ground electrode configured to transport the flame kernel starting at a spark location between the ground electrode and the center electrode to a back chamber of the pre-chamber, the tubular portion extending axially parallel to a longitudinal axis of the pre-chamber spark plug, the tubular portion extending axially beyond the center electrode in a direction towards the first port, and the tubular portion having both longitudinal ends open to an interior space of the pre-chamber, the tubular portion having an annular groove in an inner surface of the tubular portion, the annular groove positioned adjacent to the spark location, the plurality of spokes extending radially outward from the tubular portion, the plurality of spokes disposed axially on a part of the tubular portion for a longitudinal length that is less than a total longitudinal length of the tubular portion, and the plurality of spokes positioned proximate to a longitudinal center of the pre-chamber to suspend the tubular portion in the pre-chamber with both longitudinal ends open to the interior space of the pre-chamber;
   causing, with the tubular portion of the ground electrode, the flame kernel to be transported to the back chamber of the pre-chamber axially behind the tubular portion of the ground electrode;
   permitting flow of a second amount of air/fuel mixture into the front chamber through a second port and directing the flow of the second amount of air/fuel mixture such that the second amount of air/fuel mixture flows at least partially around the outside of the tubular portion in a swirling motion around the outside of the tubular portion and further into the back chamber to be ignited by the flame kernel therein; and
   causing, with the tubular portion of the ground electrode, a developing flame from the flame kernel to spread from the back chamber, around the tubular portion, and toward the front chamber;
   wherein the ignition of the first and second amounts of air/fuel mixture causes a flame jet to issue from the first and second ports, and
   wherein the front chamber is arranged between the back chamber and the first and second ports.

2. The method of claim 1, wherein permitting flow of a first amount of air/fuel mixture through a first port comprises permitting flow of the first amount of air/fuel mixture through a center hole in an end cap of the pre-chamber spark plug.

3. The method of claim 1, wherein permitting flow of a second amount of air/fuel mixture through a second port comprises permitting flow of the second amount of air/fuel mixture through a port having a longitudinal axis that is not parallel with, not perpendicular to, and does not intersect a longitudinal axis of the pre-chamber spark plug.

4. The method of claim 3, wherein permitting flow of the second amount of air/fuel mixture through the second port comprises permitting flow of the second amount of air/fuel mixture through the port configured to create a turbulent flow of the second amount of air/fuel mixture in the pre-chamber.

5. The method of claim 1, wherein the first amount of air/fuel mixture flows through the inside of the tubular portion, and the second amount of air/fuel mixture flows around the outside of the tubular portion and further into the back chamber.

6. The method of claim 1, wherein permitting flow of the second amount of air/fuel mixture into the front chamber through the second port comprises flowing the second amount of air/fuel mixture around a portion of the tubular portion that extends axially beyond the plurality of spokes, and further flowing the second amount of air/fuel mixture between the spokes and further into the back chamber.

7. The method of claim 1, wherein the longitudinal length of the spokes along the longitudinal axis is less than half of the total longitudinal length of the tubular portion along the longitudinal axis.

8. The method of claim 1, wherein an upper longitudinal end of the tubular portion extends axially beyond the plurality of spokes and into the interior space of the back chamber, and a lower longitudinal end of the tubular portion extends axially beyond the plurality of spokes and into the front chamber.

9. The method of claim 8, wherein the upper longitudinal end of the tubular portion extends axially behind the spark location and into the back chamber.

\* \* \* \* \*